Oct. 3, 1939.  M. A. HESS  2,174,658
BREAD ROLL MACHINE
Filed May 31, 1938  3 Sheets-Sheet 2
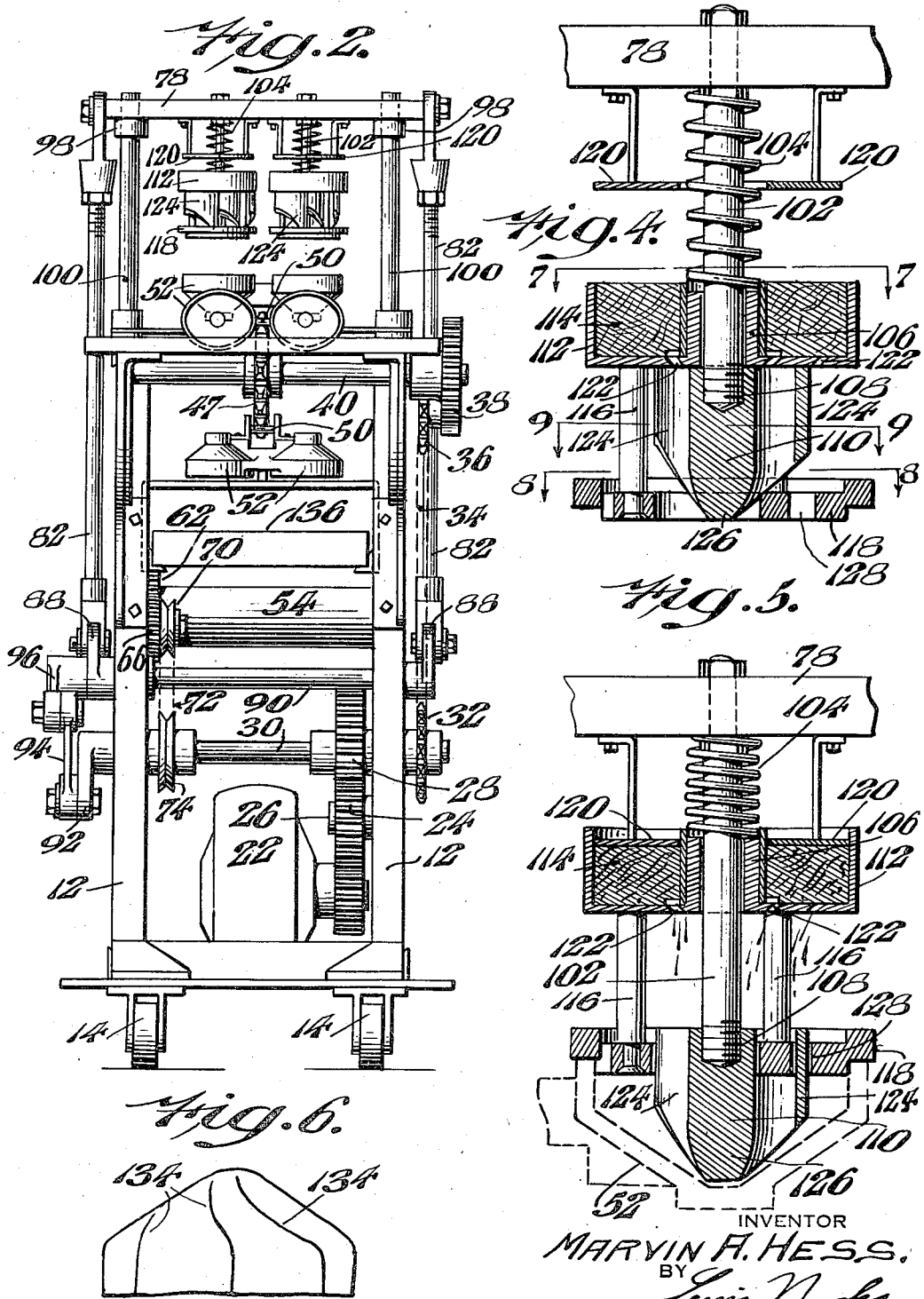

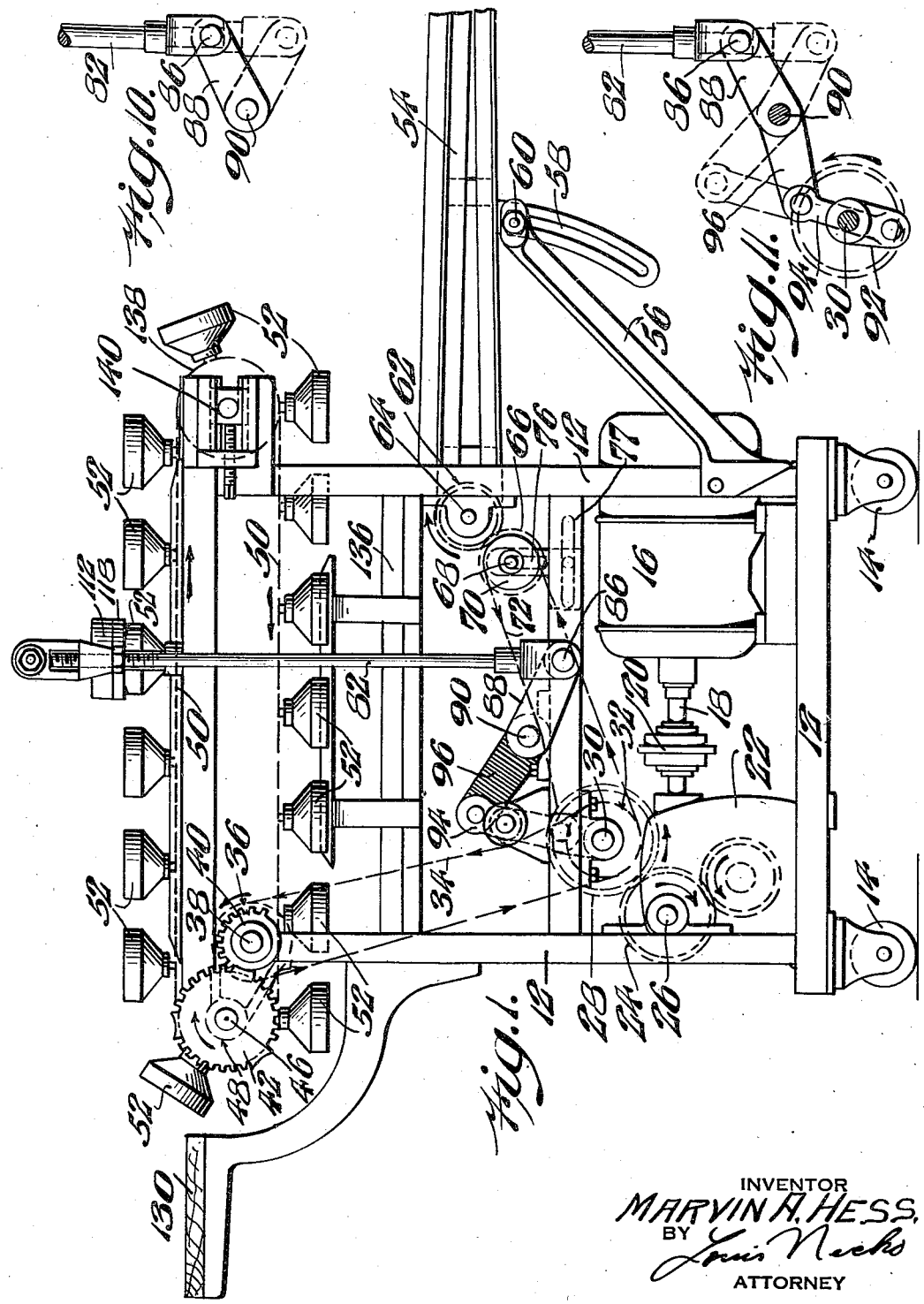

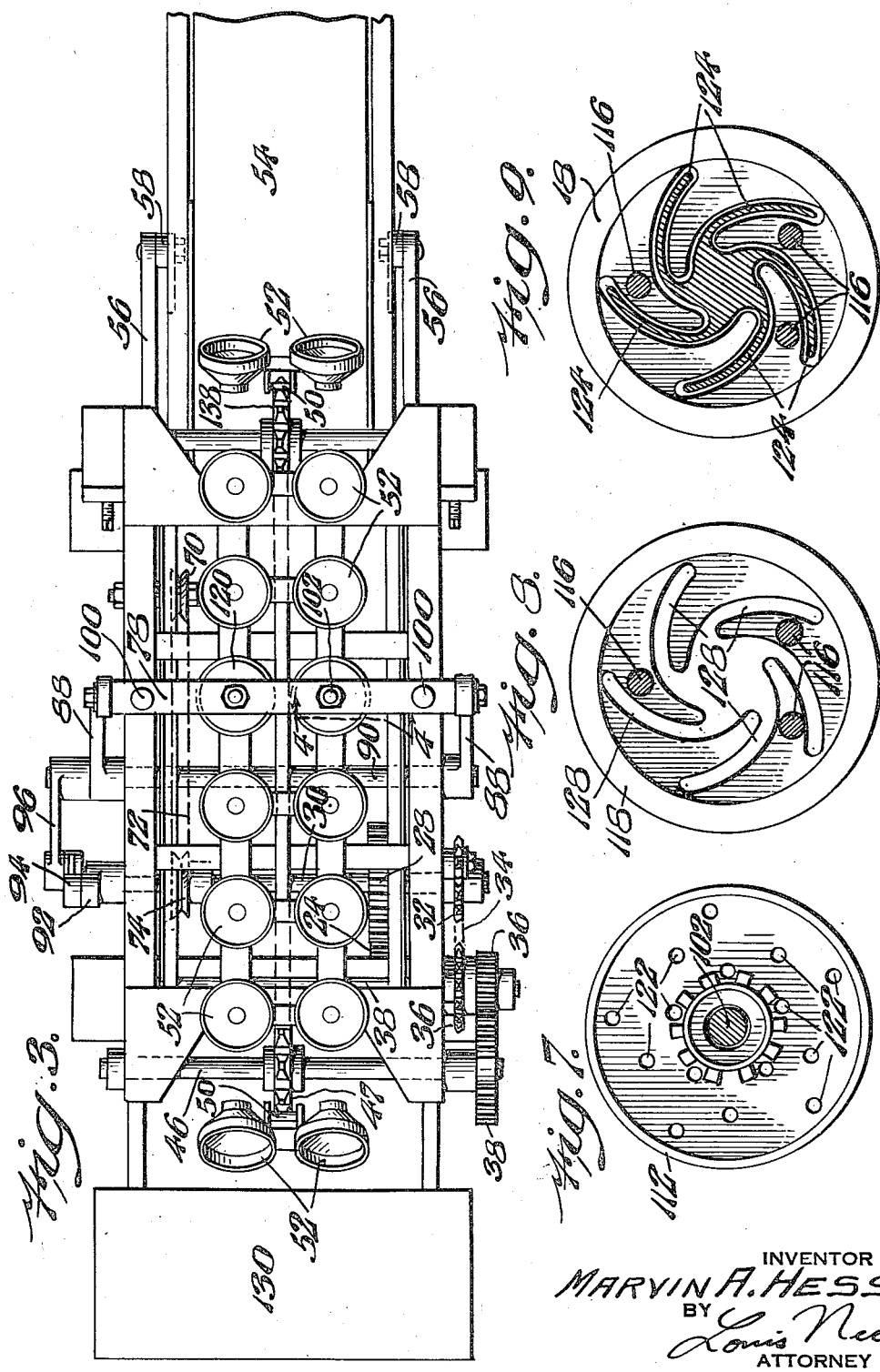

Patented Oct. 3, 1939

2,174,658

UNITED STATES PATENT OFFICE 2,174,658

BREAD ROLL MACHINE

Marvin A. Hess, East Lansdowne, Pa., assignor to F. M. Stewart, Philadelphia, Pa.

Application May 31, 1938, Serial No. 210,865

2 Claims. (Cl. 107—8)

My invention relates to a bread roll machine and it relates more particularly to a machine for forming or shaping rolls of dough which, when baked, will produce the type of bread roll known in the trade as "Kaiser roll".

My invention still further relates to a machine of this character which automatically acts upon or shapes the lumps of dough fed into it, and which is capable of automatically shaping a plurality of lumps of dough simultaneously thus eliminating the necessity of shaping such rolls by hand and thereby greatly increasing the speed and efficiency as well as producing a more uniform and desirable product.

My invention further relates to a bread roll machine of this character in which provision is made for lubricating the parts of the machine which come into contact with the dough to prevent the sticking of the dough to such parts while at the same time preventing access to the dough of any foreign matter.

My invention still further relates to a machine of this character which is extremely simple and durable in construction and which needs no skill whatsoever in its operation since it is automatic in its entirety except for feeding the lumps of dough into the machine, it being noted that this feeding of the dough into the machine can be done manually, or, if desired, automatic means for cutting and delivering the dough into the shaping machine can be used.

The construction and operation of my novel machine is clearly explained in the following specification and the accompanying drawings in which:

Fig. 1 represents a side elevation of a bread roll machine embodying my invention.

Fig. 2 represents a left hand elevation of Fig. 1.

Fig. 3 represents a plan view of Fig. 1.

Fig. 4 represents, on an enlarged scale, a vertical section through the bread roll shaping plunger forming part of my invention, the same being on line 4—4 of Fig. 3.

Fig. 5 is a view similar to Fig. 4 showing the bread shaping plunger in its operative position.

Fig. 6 represents a view in diagrammatic outline of the bread roll shaped by the plunger shown in Figs. 4 and 5.

Fig. 7 represents a view on line 7—7 of Fig. 4 showing the construction of a grease cup forming part of the plunger construction and shown detached, certain parts being omitted.

Fig. 8 represents a section on line 8—8 of Fig. 4.

Fig. 9 represents a section on line 9—9 of Fig. 4.

Figs. 10 and 11 represent details of the plunger actuating machine.

Referring to the drawings in which like reference characters indicate like parts, and more particularly to Fig. 1, 12 designates any suitable frame consisting of the necessary uprights and cross-pieces and which is preferably supported on the rollers 14, whereby the machine can be moved from place to place with ease. Carried by the frame 12 is an electric motor 16 having the shaft 18 and fly wheel 20. The shaft 18 leads to any suitable gear-reduction mechanism 22 of any conventional construction, which need not be described in detail, and from which emerges the gear 24 which is mounted on the shaft 26. The gear 24 meshes with the cog wheel or the like 28 on the shaft 30. The shaft 30 carries a pulley or sprocket wheel 32 on which travels the belt or sprocket chain 34, which rides on the pulley or sprocket wheel 36 on the shaft 38 which carries the pinion 40 which in turn is adapted to mesh with the mutilated gear 42 on the shaft 46. 48 designates a bracket carried by the frame 12 for supporting the shaft 46. The shaft 46 carries the sprockets 47 over which rides the sprocket chain or apron 50 which carries the cups 52. The engagement of the mutilated pinion 40 and the mutilated gear 42 gives the sprocket chain 50 an intermittent movement. As will be seen from Fig. 3, I arrange the cups 52 in two parallel rows but this is only a matter of convenient, since, if it is desired to build a wider machine, three or more parallel rows of cups can be used. 54 designates a suitable conveyor arrangement in the nature of an endless belt, this conveyor being adjustably supported by the arms 56 engaging the slotted brackets 58 as at 60. The endless conveyor is simply for carrying the rolls after they drop out of the cups 52 to any desired point and it need not be described in detail except to say that it is actuated by the gear 62 on the shaft 64, the gear 62 meshing with the gear 66 which is on the shaft 68 which also carries the pulley 70 over which travels the belt 72 which in turn is actuated by the pulley or the like 74 (see Fig. 2) on the shaft 30. The shaft 68 carrying the gear 66 and pulley 70 is mounted for vertical and horizontal adjustment as shown in dotted lines at 76 and 77. Disposed above the cups 52 is a cross-arm 78 which supports the roll-shaping plungers best seen in Figs. 4 and 5, it being understood that as many plungers are used as there are rows of cups 52. The plungers shown in Figs. 4 and 5 must be reciprocated up and down intermittently to act on the lumps of dough in the cups 52, and to that end they are supported by the arms or rods 82 which are pivoted at their lower ends as at 86 to the links 88 which are secured at their other ends to the rocker shaft 90. In order to actuate the rocker shaft 90 I provide the shaft 30 with a hub 92 which is turned by the shaft in the direction of the arrow in Fig. 11 and to the hub 92 I connect the link 94 which is in turn connected to the shaft 90 by the link 96. In this way, as the shaft 30 is rotated in the direction of the arrow in Fig. 11, the hub 92 and the links 94 and 96, as well as the arms 82, are reciprocated up and down from the position shown in solid lines in Figs. 10 and 11 to the position shown in dotted lines in these same figures. This results in lowering and raising or vertically reciprocating the cross-arm 78 which is provided with the bearings 98 which move up and down on the guide rods 100.

Referring now to Figs. 4 and 5 in which the detail construction of the plungers carried by the cross-arm 78 is shown, it will be noted that the plunger construction comprises a stem 102 which is tensioned downwardly by the spring 104 confined between the cross-arm 78 and the stop or bushing 106. The lower end of the stem 102 is suitably secured as at 108 to a shaping head 110. 112 designates a grease cup adapted to contain an absorbent material 114 saturated with lard, oil, or other shortening, and from the bottom of the cup 112 extends downwardly the stems 116 which carry the bottom plate 118. 120 designates a stationary plate preferably made in two sections so that it may be applied or removed without dismantling the parts and which, when the spring 104 is compressed with the plunger in its lower position as shown in Fig. 5, is adapted to act upon the grease saturated material 114 to squeeze some of the grease through the apertures 122 to lubricate the shaping head 110. The grease saturated material 114 is also preferably made of two sections so that it may be replaced when necessary without dismantling the plunger construction proper. As will be seen from Figs. 2, 4 and 5 and 9 the shaping head is in the nature of a spiral assembly of blades 124 which merge at their lower points as at 126, and which are adapted to pass downwardly through a corresponding spirally arranged cut-out 128 in the bottom plate 118 as best seen in Figs. 8 and 9.

The operation is as follows:

With the cups 52 travelling intermittently in the direction of the arrow in Fig. 1 the lumps of dough, in the nature of more or less spherical balls, is fed into the cups from the platform 130 and the cups travel until they reach under the cross-arm 78, whereupon the operating mechanism shown in Figs. 10 and 11, which is synchronously timed, depresses the plungers shown in Figs. 4 and 5 downwardly upon the cups 52 as best seen in Fig. 5. This causes the blades 124 of the shaping head 110 to project downwardly through the cut-out 128 in the plate 118 and to sink into the lumps of dough in the cups 52 thus cutting them and shaping them into a starlike effect which is known in the trade as "Kaiser roll". As the cups travel past the cross-arm 78 the rolls drop or are removed from the cups 52 onto the conveyor 54 which takes them to the baking oven or other point of disposal. It is understood that after the plungers have been depressed to cut or shape the lumps of dough as desired, the actuating mechanism shown in Figs. 10 and 11 elevates the plungers to permit the second set of cups to approach, and, while the second set of cups is held stationary in registration with the cross-arm 78, the actuating mechanism again depresses the plungers and so on. The intermittent motion of the cups, and its synchronization with the movement of the plungers, is effected by the mutilated gear and pinion arrangement 42 and 40, as well as by the timed reciprocation of the rocker shaft 90 which actuates the arm 82 carrying the cross-arm 78.

In Fig. 6 is shown diagrammatically a lump of dough which originally was more or less spherical and which, after the action of the blades 124 of the shaping heads 110, is provided with the cuts 134 which simulate the appearance of a "roll" made from separate strips of dough twisted together.

In order to prevent any remnants of dough or flour in the cups 52 from falling on the working parts of the machine when the cups 52 are inverted on their return movement, I provide the shield or tray 136. The sprocket chain or apron 50 rides at the delivery end of the machine over the sprocket 138 which is adjustably mounted at 140.

Having thus described my invention, what I claim as new and desire to secure by Letters Patent is:

1. In a machine of the character stated, a supporting frame, an endless apron carried by said frame, a plurality of cups carried by said apron and adapted to receive the lumps of dough to be treated, a cross-bar mounted for reciprocal movement above said apron, plungers carried by said cross-bar and including shaping heads adapted to act on said lumps of dough in said cups, a driving mechanism for intermittently actuating said apron and simultaneously and synchronously actuating said cross-bar, whereby said plungers are brought into engagement with the lumps of dough in said cups while such cups are stationary, and means for lubricating said shaping heads including, containers carried by said plungers, pieces of porous material in said containers adapted to be soaked with a lubricant, and means carried by said cross-bar for squeezing some of the lubricant out of said porous material when said cross-bar is actuated to depress said plungers, there being openings in the bottom of said containers for the passage of the lubricant squeezed from said porous materials into said shaping heads.

2. In a machine of the character stated, a supporting frame, an endless apron carried by said frame, a plurality of cups carried by said apron and adapted to receive the lumps of dough to be treated, a cross-bar mounted for reciprocal movement above said apron, plungers carried by said cross-bar and including shaping heads adapted to act on said lumps of dough in said cups, a driving mechanism for intermittently actuating said apron and simultaneously and synchronously actuating said cross-bar, whereby said plungers are brought into engagement with the lumps of dough in said cups while such cups are stationary, and means for lubricating said shaping heads including, containers carried by said plungers, pieces of porous material in said containers adapted to be soaked with a lubricant, and means carried by said cross-bar for squeezing some of the lubricant out of said porous material when said cross-bar is actuated to depress said plungers, there being openings in the bottom of said containers for the passage of the lubricant squeezed from said porous materials into said shaping heads.

MARVIN A. HESS.